Sept. 9, 1969     YUKIO KASHIWABA     3,465,707
CLOGGING INDICATOR FOR AIR CLEANERS
Filed April 23, 1968
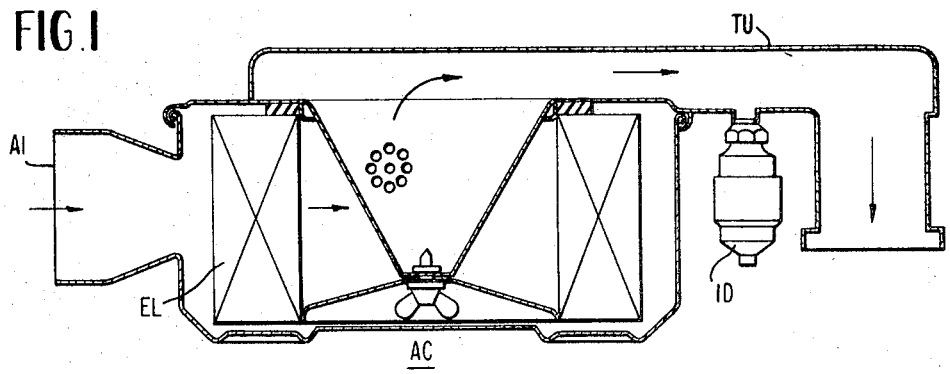
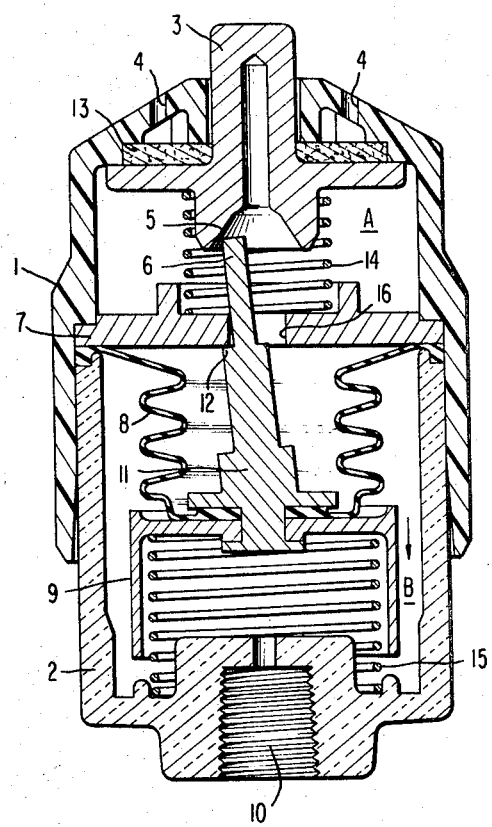
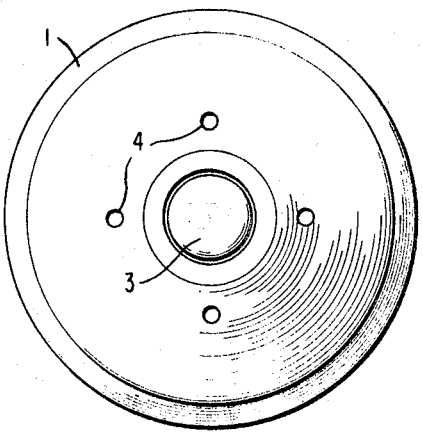
INVENTOR
YUKIO KASHIWABA
BY *Young & Thompson*
ATTORNEYS

United States Patent Office 3,465,707
Patented Sept. 9, 1969

3,465,707
CLOGGING INDICATOR FOR AIR CLEANERS
Yukio Kashiwaba, Tokyo, Japan, assignor to Tsuchiya
   Manufacturing Company Limited, Tokyo, Japan
Filed Apr. 23, 1968, Ser. No. 723,521
Claims priority, application Japan, Mar. 5, 1968,
43/16,690
Int. Cl. G01l 19/12; B60c 23/02
U.S. Cl. 116—70                                    5 Claims

ABSTRACT OF THE DISCLOSURE

A clogging indicator comprising an opaque upper body and a transparent lower body defining two chambers therein. Said lower body acts as a visual indicating window in which a bellows separating the two chambers is provided with a warning indicating piston. A pin extending in an eccentric direction with respect to the axis of the body is provided by securing one end thereof to the center of the bellows. This pin acts to lock the position of the indicating piston by a mechanical engagement with its shoulder against an edge of a partition provided between the two chambers, which engagement can easily be unlocked by pressing a push button provided at top of the upper body and thus bringing the position of the pin to coincide with the axial direction by means of a funnel like reentrant recess provided at lower end of the push button.

BACKGROUND OF THE INVENTION

An air cleaner element, for instance for use in an automotive vehicle, must be cleaned or replaced by a new element whenever the filter element becomes clogged with dust to a certain extent, since otherwise the efficiency of the air cleaner decreases. Conventional practice of such replacement may, for instance, be based on a certain empirical standard of running mileage or a certain occasion of inspection of the vehicle. Under such conventional replacement practice, a driver may continue to use an air cleaner element which has been already inefficient owing to the clogging of the filter element or he may replace an air cleaner element which is still in a serviceable condition.

The present invention is intended to obtain an indicator suitable to indicate the most appropriate replacement time of an air cleaner particularly for use in an automotive vehicle.

SUMMARY OF THE INVENTION

The present invention relates to an indicator of air cleaner clogging, more particularly for use with air cleaners in automotive vehicles.

The indicator according to the invention has as its feature to give a clear indication by a simple construction at an appropriate time to replace or to clean an air filter element owing to the clogging of dust in the filter element which causes a decrease of the filter efficiency to a certain extent.

BRIEF DESCRIPTION OF THE DRAWINGS

FIG. 1 shows schematically an air intake system having an air filter and a manifold portion, to which the indicator of the invention is secured, FIG. 2 is a cross sectional view of an indicator according to the invention, FIG. 3 is a top view of the same.

DESCRIPTION OF THE PREFERRED EMBODIMENT

In FIG. 1 the mounting of the indicator according to the present invention is shown. In this figure, ID is an indicator according to the invention, AC is a casing of the air cleaner, EL is an air cleaner element, AI is an air inlet to the cleaner and TU is a manifold tube leading to an engine or to a carburetor.

The air from the air inlet AI is filtered by the air cleaner element EL and then passed through manifold tube TU to the engine. When the dust clogs the cleaner element the efficiency of the cleaner element becomes less and the negative pressure in the manifold tube TU increases according to the degree of clogging of the cleaner element. The indicator according to the invention is to indicate the clogging of the filter cleaner element when the clogging reaches a certain degree. The indicator operates by means of the above mentioned negative pressure when the negative pressure exceeds a certain limit.

FIGS. 2 and 3 show more details of the indicator according to the invention. The indicator comprises an upper body 1 made of opaque plastic and a lower body 2 made of transparent plastic. These two bodies are joined together with an interposed of partition 7 in a suitable manner. 10 is an inner thread provided in the neck portion of the lower body of the indicator. By means of this thread the indicator is secured to the manifold tube TU. 3 is a push button provided at the top of the upper body 1. This button has a funnel shaped reentrant lower end portion 5, which is arranged at a position to slidably engage with the top end 6 of pin 11.

Inside of the jointed body, a bellows 8 made of, for instance, rubber is arranged to separate two chambers A and B. 9 is an indicating piston of a bright color such as red. 4 is a pin hole for air leakage and 13 is a dust filter. A spring 14 in the upper chamber A presses the push button 3 upward and a spring 15 in the lower chamber B presses the indicating piston 9 also upward.

The bellows 8 and the indicating piston 9 are secured together by the lower end portion of pin 11. This pin 11 is held by the piston 9 which is in turn held by the bellows 8 and the spring 15. By this construction the top of pin 11 can freely move in the hole 16 provided in the partition 7.

The operation of this indicator will be described hereinafter. As shown generally in FIG. 1, the indicator according to the present invention is secured at a suitable portion of the manifold tube TU between the filter element EL and the engine wherein a negative suction pressure is produced. This negative pressure is applied through the joint portion to the lower chamber B and acts to pull down the bellows 8 and to expand the bellows by a pressure difference between the atmospheric pressure in the upper chamber A, which is connected to open air through the holes 4. According to the degree of clogging of the air filter cleaner element this negative pressure increases and if this negative pressure arrives at a predetermined value the indicating piston 9 is pulled downward against the mechanical force of spring 15. When the indicating piston 9 is pulled down, the pin 11 secured in an oblique direction at the center of the piston 9 also pulled downward. When the piston 9 is pulled down over a certain stroke, a shoulder edge 12 of the pin 11 becomes engaged with the edge of hole 16 in the partition 7 as shown in FIG. 2. Piston 9 is locked at this position and indicates the warning red color through the transparent window of the lower body 2 so that a visible warning is established.

This warning condition is continued even though the engine is stopped. This indication is very clear and reliable. Therefore the driver of the vehicle may easily know the most suitable time for the air filter cleaner element to be cleaned or changed for a new element. This indicating condition may easily be released to the initial nonindicating condition by merely pressing down the push button 3 after the cleaning or the change of the element is completed. When the push button 3 is depressed the funnel shaped reentrant portion 5 comes into contact with the top edge 6 of the pin 11 and guides the pin 11 to the central axial position, so that the shoulder edge 12 disengages from the edge of hole 16 in the partition 7 thus the indicating piston 9 returns to its nonindicating position by the mechanical force of the spring 15. In this nonindicating position the red outer surface of the indicator piston 9 comes completely under the opaque portion of the upper body 1 so that the driver may know the condition of the air filter element.

The indicator according to the present invention has a particular feature in its very simple construction. Owing to the simple construction it is particularly suitable to manufacture all of the constructive parts from very cheap materials such as plastics or the like. Therefore the indicator according to the invention is advantageously manufactured by mass production. This affords a great advantage in obtaining a very cheap manufacturing cost while keeping a very steady operational function.

By using the indicator of the invention, a driver may easily distinguish the most appropriate time to clean or change the air filter cleaner element. Accordingly the indicator is very useful in the maintenance of automotive vehicles.

The present invention is not limited to the illustrated embodiment, but various modifications are possible without departing from the scope of the invention.

I claim:

1. A clogging indicator for air filters, comprising a hollow body having an opaque portion and a transparent portion, a bellows dividing the interior of the body into two chambers, an indicating piston in one of said chambers secured to the bellows to move between a first position in which the piston is more readily visible through said transparent body portion and a second position in which said piston is less readily visible through said transparent body portion, first spring means biasing said piston toward said second position, a locking pin movable with said piston and disposed in the other said chamber at an acute angle to the direction of thrust of said spring means, the locking pin having a shoulder thereon, a partition in said other chamber having a centrally disposed hole with the edges of which said shoulder is releasably engageable to hold said piston in said first position, a push button movable into and out of said body, second spring means in said other chamber urging said push button out of said body, said push button having a funnel-like reentrant portion at its inner end which engages with an end of said locking pin to swing said locking pin toward a position in line with the direction of thrust of said first spring means to disengage said shoulder from said edges of said hole and to permit said locking pin to move through said hole whereby said piston moves toward said second position under the influence of said first spring means, said one chamber having an opening for the withdrawal of air from said one chamber upon the creation of negative pressure by a clogged air cleaner.

2. An indicator as claimed in claim 1, the other end of said locking pin and said bellows being secured to a central portion of said piston.

3. An indicator as claimed in claim 1, said partition being secured between said opaque and transparent body portions.

4. An indicator as claimed in claim 3, said bellows being secured between said partition and said transparent body portion.

5. An indicator as claimed in claim 1, said other chamber being open to atmospheric pressure.

References Cited

UNITED STATES PATENTS

| 3,129,689 | 4/1964 | Henderson et al. | 116—34 |
| 3,145,689 | 8/1964 | O'Neal | 116—34 |
| 3,246,624 | 4/1966 | Lowther | 116—70 |
| 3,312,187 | 4/1967 | McKinlay | 116—70 |

FOREIGN PATENTS

| 217,789 | 10/1961 | Austria. |
| 604,335 | 3/1960 | Italy. |

LOUIS J. CAPOZI, Primary Examiner

U.S. Cl. X.R.

116—34; 210—90